(12) United States Patent
Mo

(10) Patent No.: US 9,344,513 B2
(45) Date of Patent: *May 17, 2016

(54) IN-SERVER REDIRECTION OF HTTP REQUESTS

(71) Applicant: Alibaba Group Holding Limited, Grand Cayman (KY)

(72) Inventor: Jianxiang Mo, Hangzhou (CN)

(73) Assignee: Alibaba Group Holding Limited, Grand Cayman, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/965,753

(22) Filed: Dec. 10, 2015

(65) Prior Publication Data

US 2016/0100024 A1    Apr. 7, 2016

Related U.S. Application Data

(63) Continuation of application No. 14/711,716, filed on May 13, 2015, now Pat. No. 9,241,042, which is a continuation of application No. 12/602,046, filed as application No. PCT/US2009/055050 on Aug. 26, 2009, now Pat. No. 9,065,865.

(30) Foreign Application Priority Data

Aug. 26, 2008    (CN) .......................... 2008 1 0214821

(51) Int. Cl.
*H04L 29/08* (2006.01)
*H04L 29/06* (2006.01)

(52) U.S. Cl.
CPC ............ *H04L 67/2814* (2013.01); *H04L 67/02* (2013.01); *H04L 67/42* (2013.01)

(58) Field of Classification Search
CPC ........................... H04L 67/2814; H04L 67/02
See application file for complete search history.

(56) References Cited

U.S. PATENT DOCUMENTS

| 6,189,030 B1 | 2/2001 | Kirsch et al. |
| 6,389,462 B1 | 5/2002 | Cohen et al. |

(Continued)

FOREIGN PATENT DOCUMENTS

| CN | 1925485 A | 3/2007 |
| JP | 2001014209 | 1/2001 |

(Continued)

OTHER PUBLICATIONS

The Chinese Office Action mailed Jan. 31, 2012 for Chinese patent application No. 200810214821.X, a counterpart foreign application of U.S. Appl. No. 12/602,046, 10 pages.

(Continued)

*Primary Examiner* — Brian J Gillis
*Assistant Examiner* — Juan C Turriate Gastulo
(74) *Attorney, Agent, or Firm* — Lee & Hayes, PLLC

(57) ABSTRACT

A method and system for HTTP request service identify a true URL content regardless of whether the target URL is redirected, and send the true URL content to a client. The requesting and sending of the redirected URL content is done internally in the HTTP server system and do not require the client to have the ability to receive and execute a URL redirection command. The server system receives a URL request from the client and generates within the server a response to the URL request. If the response does not contain any redirection information, the true URL content includes the target URL content; and if the response contains redirection information indicating a redirected URL, the true URL content includes a redirected URL content associated with the redirected URL. The client receives the true URL content in either case by submitting a request for the target URL once.

20 Claims, 6 Drawing Sheets

(56) References Cited

U.S. PATENT DOCUMENTS

| | | |
|---|---|---|
| 6,865,605 B1 | 3/2005 | Soderberg et al. |
| 6,976,090 B2 | 12/2005 | Ben-Shaul et al. |
| 7,219,299 B2 | 5/2007 | Fields et al. |
| 7,293,012 B1 | 11/2007 | Solaro et al. |
| 7,340,533 B2 | 3/2008 | Murtza et al. |
| 7,392,303 B2 | 6/2008 | Smith et al. |
| 8,291,017 B1 | 10/2012 | Issa et al. |
| 2002/0116411 A1 | 8/2002 | Peters et al. |
| 2002/0198953 A1 | 12/2002 | O'Rourke et al. |
| 2003/0187935 A1 | 10/2003 | Agarwalla et al. |
| 2003/0187956 A1 | 10/2003 | Belt et al. |
| 2004/0068579 A1 | 4/2004 | Marmigere et al. |
| 2004/0107282 A1 | 6/2004 | Chakraborty et al. |
| 2004/0187076 A1 | 9/2004 | Ki et al. |
| 2005/0015512 A1 | 1/2005 | Kale et al. |
| 2006/0095558 A1 | 5/2006 | Christian |
| 2006/0167883 A1 | 7/2006 | Boukobza |
| 2006/0265392 A1 | 11/2006 | Sunada et al. |
| 2007/0055674 A1 | 3/2007 | Sunada |
| 2007/0192246 A1 | 8/2007 | Futamase |
| 2008/0027824 A1 | 1/2008 | Callaghan et al. |
| 2008/0172404 A1 | 7/2008 | Cohen |
| 2008/0172488 A1 | 7/2008 | Jawahar et al. |
| 2008/0243793 A1 | 10/2008 | Hallett et al. |
| 2009/0006424 A1 | 1/2009 | Coppola et al. |
| 2009/0313321 A1 | 12/2009 | Parsons et al. |
| 2015/0249721 A1 | 9/2015 | Mo |

FOREIGN PATENT DOCUMENTS

| | | |
|---|---|---|
| JP | 2006163829 | 6/2006 |
| JP | 2006338436 | 12/2006 |
| JP | 2007072525 | 3/2007 |
| JP | 2008507057 | 3/2008 |
| JP | 2008518538 | 5/2008 |

OTHER PUBLICATIONS

The Chinese Office Action mailed Aug. 2, 2012 for Chinese patent application No. 200810214821.X, a counterpart foreign application of U.S. Appl. No. 12/602,046, 14 pages.

Translated Japanese Office Action mailed Sep. 10, 2013 for Japanese patent application No. 2011-525171, a counterpart foreign application of U.S. Appl. No. 12/602,046, 6 pages.

Non-Final Office Action for U.S. Appl. No. 12/602,046 mailed on Nov. 18, 2011, Jianxing Mo et al., "In-Server Redirection of HTTP Requests", 11 pages.

Office Action for U.S. Appl. No. 12/602,046, mailed on Nov. 7, 2014, Jianxiang Mo, "In-Server Redirection of HTTP Requests", 11 pages.

Final Office Action for U.S. Appl. No. 12/602,046 mailed on Apr. 10, 2012, Jianxing Mo et al., "In-Server Redirection of HTTP Requests", 13 pages.

Office action for U.S. Appl. No. 12/602,046, mailed on Jun. 19, 2014, Mo, "In-Server Redirection of HTTP Requests", 15 pages.

The Extended European Search Report mailed Jan. 21, 2016 for European patent application No. 09810535.6, 7 pages.

IN-SERVER REDIRECTION OF HTTP REQUESTS

RELATED APPLICATIONS

This application is a continuation of and claims priority to U.S. patent application Ser. No. 14/711,716, filed May 13, 2015, entitled "IN-SERVER REDIRECTION OF HTTP REQUESTS" which is a continuation of and claims priority to U.S. patent application Ser. No. 12/602,046, filed Nov. 25, 2009, which is a national stage application of international patent application PCT/US09/55050 filed Aug. 26, 2009, entitled "IN-SERVER REDIRECTION OF HTTP REQUESTS" which claims priority from Chinese patent application, Application No. 200810214821.X, filed Aug. 26, 2008, entitled "SYSTEM AND METHOD FOR REALIZING HTTP REQUEST SERVICE", which applications are hereby incorporated in their entirety by reference.

TECHNICAL FIELD

The present disclosure relates to the field of electronic commerce, and particularly relates to methods and systems of credit risk control.

BACKGROUND

The present disclosure relates to HTTP services in Web applications, and particularly relates to redirecting technology in HTTP services.

Under existing technologies, if a network user needs to visit a certain web page, the user enters an URL address corresponding to the web page on a client, and the HTTP server normally returns the web page requested by the user. However, some Internet websites use page redirecting technology to ensure that visitors are directed to relevant webpages even if target web pages intended by the visitors are under construction, going through adjustments, changing web page directory structures, transferring to the web pages at new URL addresses, or changing the web page extensions. Without a redirecting function, obsolete addresses associated with bookmarks of the network users or within search engine's databases would only return a "404" web page error message to the visitors, leading to a loss in browsing traffic. Furthermore, some websites may be associated with multiple domain names. Proper redirecting tools are needed to automatically redirect network users visiting these domain names to respective sites using redirection.

More specifically, if a standardized HTTP redirect function is used, an HTTP server first returns a redirection "3xx" command word as well as a redirected URL to a client. Upon receiving a returned redirection code (e.g., a redirection command "301", "302", "303" or "307"), the client re-submits a request to the HTTP server based on the redirected URL in order to obtain a final URL content. For instance, a redirection code "301" represents "Moved Permanently", while a redirection code "302" represents "Moved Temporarily", etc.

Using existing standardized HTTP redirect function, the client needs to first receive the redirected URL from the HTTP server, and then re-submit a new request to the HTTP server based on the redirected URL in order to obtain the final URL content. This not only wastes additional network bandwidth, but is also particularly unsuitable for circumstances which have a high network bandwidth requirement such as surfing the Internet using mobile phones. Moreover, communication fees of a network user are increased, especially if the provider and the user adopted pay-per-use mechanism. Furthermore, as the client needs to re-submit a URL request to the HTTP server, response rate is reduced, leading to poor user experience. This is especially true for the complicated networking environment of the Internet and mobile phones. In addition, if the client does not support redirection command, it will result in a re-sending failure of a URL request to the HTTP server. Therefore, solutions that provide fast and convenient URL request service to a client are needed.

SUMMARY

Disclosed are a method and a system for HTTP request service which identify a true URL content regardless of whether the target URL is redirected, and send the true URL content to a client. The requesting and sending of the redirected URL content is done internally in the HTTP server system and do not require the client to have the ability to receive and execute a URL redirection command. The server system receives a URL request from the client and generates within the server a response to the URL request. If the response does not contain any redirection information, the true URL content will include the target URL content; and if the response contains redirection information indicating a redirected URL, the true URL content will include a redirected URL content associated with the redirected URL. The client receives the true URL content in either case by submitting a request for the target URL once.

To generate a response to the URL request, the system may simply submit the URL request to the target URL, and receives an HTTP response from the target URL. In one embodiment, the response has an HTTP header. The server identifies the redirected URL associated with a 3xx redirection command in the HTTP header.

In one embodiment, to obtain the true URL content by the server according to the response, the server determines the redirected URL indicated by the response, submits a redirected URL request to the redirected URL, and receives the redirected URL content from the redirected URL.

The server system for HTTP request service has a server computer which is programmed to perform the acts described herein.

Using the disclosed system and the method, upon sending a URL request to an HTTP server, a client obtains a true URL content without having to re-submit a request for a redirected URL to the HTTP server. The user only needs to send an original URL request to the server once in order to obtain a true URL content. This saves network bandwidth and cost, and improves user experience. Furthermore, the number of URL requests sent from a client to an HTTP server is reduced to lower the connection burden on the HTTP server. The system and method do not require the client to support a redirection function, as the redirection function is performed internally by the HTTP server.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Exemplary embodiments are described in further detail below using the accompanying figures.

In the presence disclosure, a "module" or a "unit" in general refers to a functionality designed to perform a particular task or function. A module or a unit can be a piece of hardware, software, a plan or scheme, or a combination thereof, for effectuating a purpose associated with the particular task or function. In addition, delineation of separate units does not necessarily suggest that physically separate devices are used. Instead, the delineation may be only functional, not structural, and the functions of several units may be performed by a single combined device or component. When used in a computer-based system, regular computer components such as a processor, a storage and memory may be programmed to function as one or more units or devices to perform the various respective functions.

Figure 1:
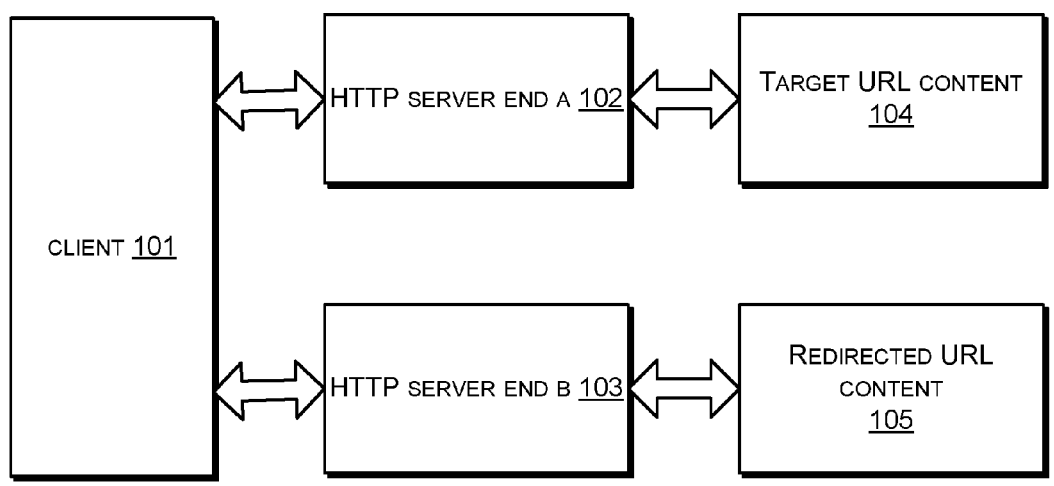
FIG. 1 shows a functional block diagram illustrating an exemplary process of sending a URL request from a client to an HTTP server using an existing technology.

FIG. 1 shows a functional block diagram illustrating an exemplary process 100 of sending a URL request from a client to an HTTP server using an existing technology. As shown in FIG. 1, an system includes a client 101, an HTTP server end A 102, an HTTP server end B 103, a target URL content 104, and a redirected URL content 105. It is appreciated that the HTTP server end A 102 and the HTTP server end B 103 may belong to a same server or different servers.

For example, suppose a user at the client 101 needs to visit a certain web page, and enters a URL http://www.alisoft.com/im/gettip.html into an address field of a browser. The browser receives a command, and establishes a connection with the HTTP server end A 102. The HTTP server end A 102 in this case is a part of a server hosting the website of www.alisoft.com. The HTTP server end A 102 processes a request for the URL. Suppose the content corresponding to the above target URL ( . . . /im/gettip.html) has been modified, and the provider of the URL has temporarily redirected the target URL to a different webpage with a redirected URL http://www.alisoft.com/portal/getnewtip.html. In this case, the HTTP server end A 102 returns a redirection command "302" and a redirected URL to the client 101. Upon receiving the redirection command "302" and the redirected URL (i.e., http://www.alisoft.com/portal/getnewtip.html), the client 101 re-submits a URL request to the HTTP server end B 103 based on the received new URL (redirected URL). The HTTP server end B 103 in this case is also a part of the server hosting the website of www.alisoft.com. The HTTP server end B 103 processes the URL request, and returns the redirected URL content 105 to the client 101.

In this description, the target URL content 104 refers to a content of a target URL intended to visit by a client. If the target URL is not redirected, the target URL content would have been normally returned after the client 101 submits a request for the target URL. In the above example, the target URL content 104 is the content of the webpage http://www.alisoft.com/portal/getip.html. The redirected URL content 105 refers to a content of the redirected URL sent by the provider of the contents. The redirected URL content is the content intended to be obtained by the client 101 as a result of redirecting. In the above example, the redirected URL content 105 is the content of the redirected webpage of http://www.alisoft.com/portal/getnewtip.html.

In the above example, regardless of whether the HTTP server end A 102 and the HTTP server end B 103 belong to the same server or different servers, two separate requests need to be sent to the HTTP server ends from the client 101. Specifically, within a process from submitting a URL request to obtaining the URL content as illustrated, one request is submitted for the original URL intended by a user, and another request is submitted for the redirected URL.

Figure 2:
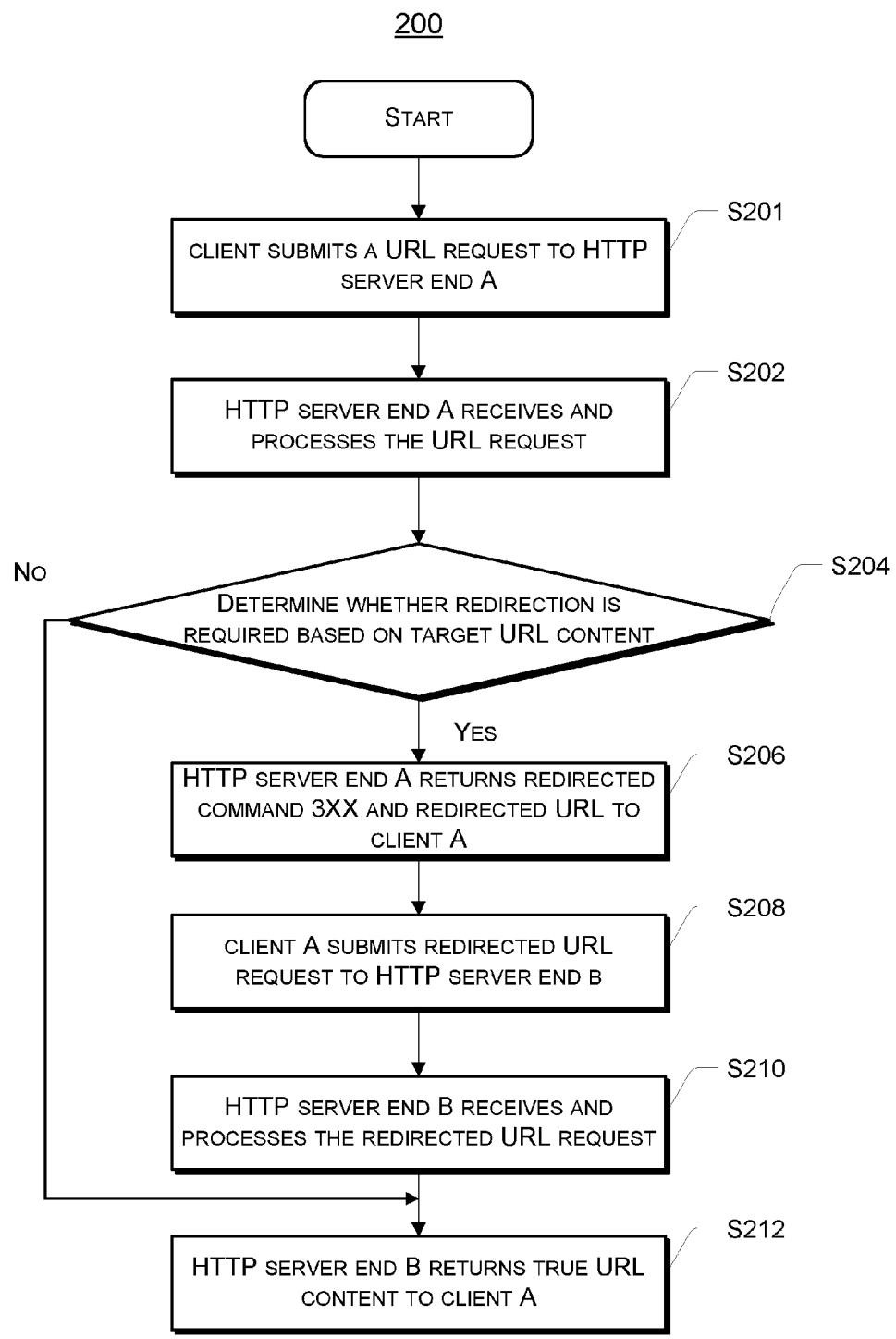
FIG. 2 shows a flow chart illustrating an exemplary process of sending a URL request from a client to an HTTP server according to the existing technologies.

FIG. 2 shows a flow chart illustrating an exemplary process 200 of sending a URL request from a client to an HTTP server according to the existing technologies. The process is described as follows.

Block S201: The client 101 sends a URL request to the HTTP server end A 102.

Block S202: The HTTP server end A 102 receives and processes the URL request.

Block S204: Based on the target URL content 104, the HTTP server end A 102 determines whether a redirection is required. Specifically, if the service provider has redirected the URL requested by the user, the HTTP server end A 102 analyzes the request, and obtains a redirection command "3xx" and a redirected URL associated therewith. If the redirection is not required, the HTTP server end A 102 returns the target URL content directly to the client.

Block S206: If the redirection has been arranged by the URL content provider, the HTTP server end A 102 returns the redirection command "3xx" (e.g., "301", "302", "303", or "307", etc) and the redirected URL to the client 101.

Block S208: The client 101 sends a new URL request for the redirected URL to the HTTP server end B 103.

Block S210: The HTTP server end B 103 receives and processes the new URL request.

Block S212: The HTTP server end B 103 returns the redirected URL content 105 to the client 101.

Corresponding to Block S206, the client 101 receives the redirection command "3xx" and the redirected URL from the HTTP server end A 102. This implicitly requires that the client 101 support a redirection command, otherwise the client 101 would fail to send a redirected URL request to the HTTP server end B 103.

Figure 3:
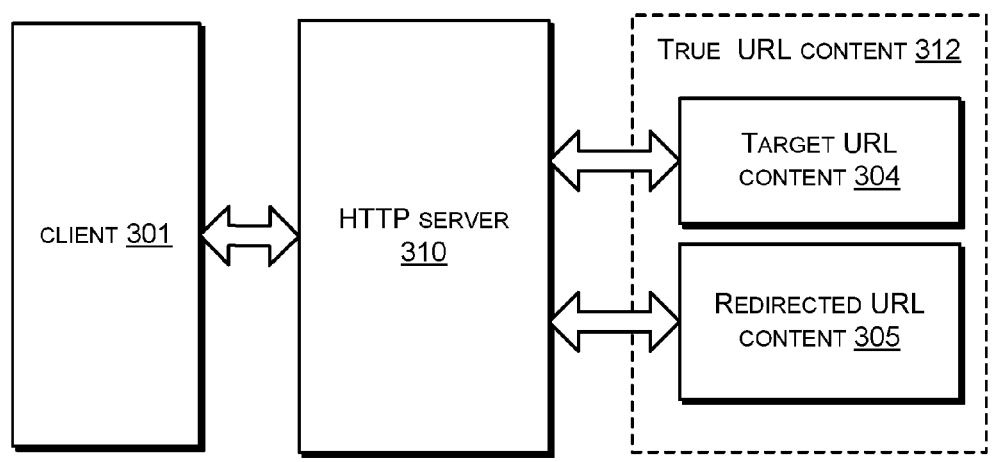
FIG. 3 shows a block diagram illustrating an exemplary process of sending a URL request from a client to an HTTP server in accordance with the present disclosure.

FIG. 3 shows a block diagram illustrating an exemplary system 300 of sending a URL request from a client to an HTTP server in accordance with the present disclosure. System 300 includes a client 301 and an HTTP server 310 which hosts or has access to a target URL content 304 and a redirected URL content 308. The definitions of target URL content 304 and the redirected URL content 305 are the same as target URL content 104 and the redirected URL content 105 described in FIG. 1.

For the purpose of illustration, assume the user intends to visit a target URL http://www.alisoft.com/im/gettip.html, and the provider has redirected this URL to another URL http://www.alisoft.com/portal/getnewtip.html. After the user sends a URL request using the client 301, the HTTP server 310 receives and processes the URL request. In one embodiment, the server 310 sends the URL request of the client 301 to the target URL and receives a response. The server 310 determines based on the response whether a redirection is required. If the redirection is not required, the server 310 sends the requested target URL content 304 to the client 301. If a redirection is required, the server 310 submits a request to the redirected URL http://www.alisoft.com/portla/getnewtip.html to obtain the redirected URL content 305, and returns the obtained redirected URL content 305 to the client 301.

In other words, server 310 always returns the true URL content 312 to client 301, which may or may not be aware of any redirecting activities taking place within server 310. The true URL content 312 is obtained by the server 310 according to the response generated within the server in reaction to the URL request of the client 301. The content of the true URL content 312 depends on whether the redirection is required of the target URL. In one embodiment, if the response does not contain any redirection information, the true URL content 312 will include the target URL content 304; and if the response contains redirection information indicating a redirected URL, the true URL content 312 will include a redirected URL content 305 associated with the redirected URL.

In one embodiment, the response has an HTTP header. If the server 310 determines that a command word of the HTTP header in the response is a redirecting command "301", "302", "303", or "307", and that the HTTP header also includes a Location header and an associated redirected URL, the server 310 decides that redirection is needed and submits a request to the redirected URL designated by the Location.

Upon receiving the redirected URL content 305, the server 310 returns the content to the client 301. This completes the HTTP request service requested by the user.

As shown in FIG. 3, the interactions between client 301 and an HTTP server 310 is different from the interactions between client 101 and the HTTP server ends 102 and 103. In FIG. 1, client 101 first submits a URL request to the HTTP server end A 102 which returns a redirection command and a redirected URL to the client 101. The Client 101 then sends another request for the redirected URL to the HTTP server end B 103. The HTTP server end B 103 returns the redirected URL content to the client 101. As a result, Client 101 is required to submit two URL requests to the HTTP server ends regardless of whether the HTTP server end A 102 and the HTTP server end B 103 belong to a same server.

In comparison, the client 301 submits an original URL request to the HTTP server 310. Regardless of whether the URL request has been redirected by the provider to a new URL, the HTTP server end returns a true URL content 312 directly to the client 301. The true URL content 312 may be the original target URL content 304, or the redirected URL content 305, depending on the redirection set by the provider. The client 301 submits a URL request only ones and receives a true URL content. This may improve the user experience because in practice, the user may be only concerned about obtaining a true URL content using an original URL request, and does not care whether a redirection command and a redirected URL are first returned, and a URL request based on the redirection command and the redirected URL is then sent to the HTTP server to obtain the true URL content.

Furthermore, because a client only needs to submits a URL request once in order to obtain a true URL content corresponding to the URL request, interaction between the client and the HTTP server is more streamlined and saves network bandwidth. From the HTTP server 310's perspective, number of URL requests sent from the claims to the HTTP server is also reduced.

Figure 4:
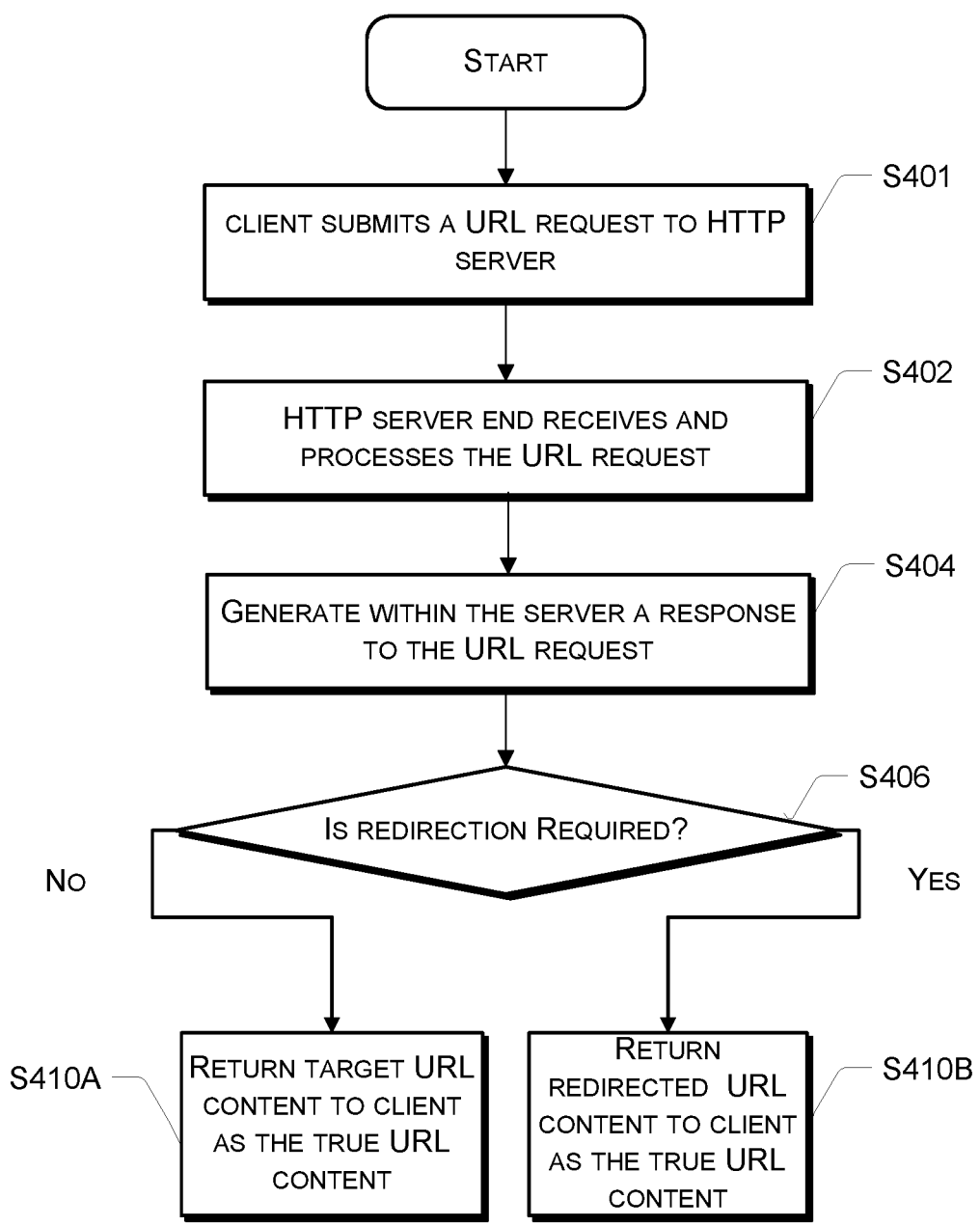
FIG. 4 shows a flow chart illustrating an exemplary process of sending a URL request from a client to an HTTP server in FIG. 3.

FIG. 4 shows a flow chart illustrating an exemplary process 400 of sending a URL request from a client to an HTTP server in FIG. 3. FIG. 4 illustrates an interactive process among the client 301 and the HTTP server 310. The process 400 is described as follows.

Block S401: The client 301 sends a request for a target URL to the HTTP server 310. The request is to request a target URL content located at the target URL which may be hosted on or accessible by the server 310.

Block S402: The server 310 receives and processes the URL request.

Block S404: the server 310 generates a response to the URL request. In one embodiment, the server 310 sends the URL request to the target URL and receives a response (a return). The server 310 then analyzes the response to determine whether a redirection is required by the provider as shown the next block S406. It is appreciated that such information of redirection requirement may be stored within the server 310 and made directly available for the server 310 to analyze.

Block S406: The server 310 determines whether a redirection is required for the URL. If the redirection is not required, the process proceeds to Block S410A. If the redirection is required, the process continues to Block S410B. For example, the server 310 analyzes an HTTP header of the response returned from the originally requested target URL. If a command word returned in the HTTP header is a redirecting command "3xx", and a Location header and a URL are included in the response, the server 310 determines that the redirection is required.

Block S410A: In case where no redirection is required, the server 310 returns the originally requested target URL content 304 as the true URL content to the client 301.

Block S410B: Upon deciding that redirection is required, the server 310 returns the redirected URL content 305 as the true URL content to the client 301. In one embodiment, the server 310 directly submits a request to the redirected URL for the redirected URL content 305, and sends the received redirected URL content 305 to the client 301.

As shown in the above process, the server 310 always returns a true URL content 312 upon a single URL request by the client 301. The above block S406 is used to determine and obtain the two URL content according to the response generated by the server 310 in reaction to the original request for the target URL. The true URL content 312 may be the originally requested URL content 304, or the redirected URL content 305, depending on whether redirected is required.

The specific implementations, server 310 may be any suitable server or server system which has common computer components such as processor(s), I/O devices, computer readable media, and network interface (not shown). The processor(s) may be programmed to perform the acts involved in the processes described herein. In one embodiment, the server 310 may be programmed to have various functional modules to perform corresponding functions, as described below.

Figure 5:
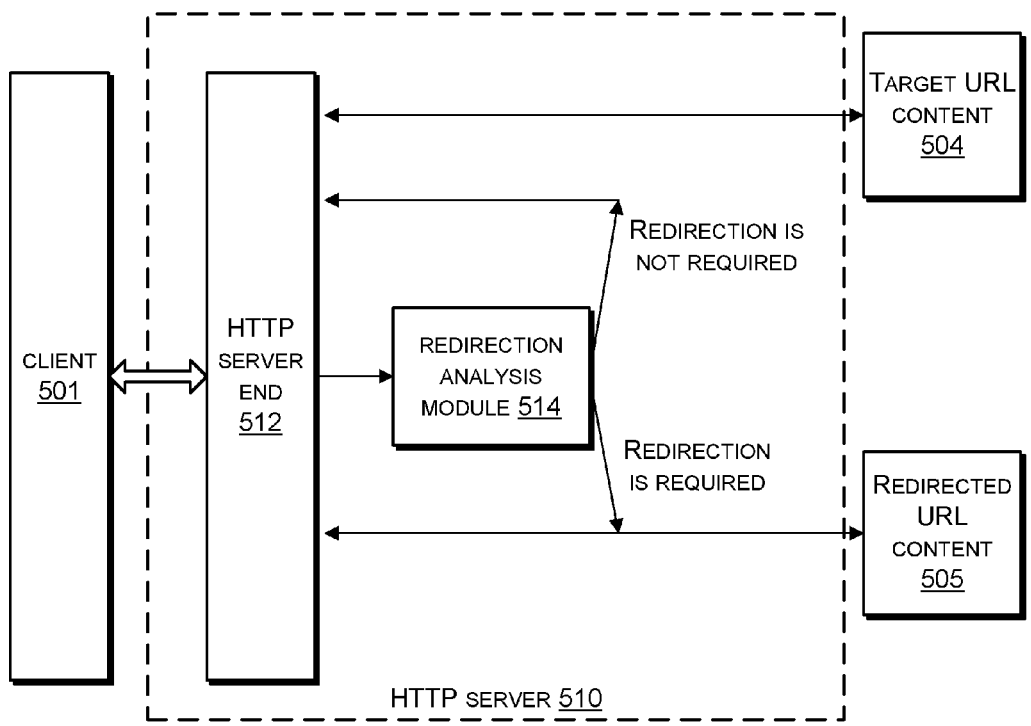
FIG. 5 shows a functional block diagram illustrating another exemplary process of sending a URL request from a client to an HTTP server in accordance with the present disclosure.

FIG. 5 shows a functional block diagram illustrating another exemplary system 500 of sending a URL request from a client to an HTTP server in accordance with the present disclosure. System 500 includes a client 501 and an HTTP server 510 which hosts or has access to a target URL content 504 and a redirected URL content 505. The HTTP server 510 includes an HTTP server end 512 and a redirection analysis module 514. The definitions of target URL content 504 and the redirected URL content 505 are the same as target URL content 104 and the redirected URL content 105 described in FIG. 1.

For the purpose of illustration, assume the user intends to visit a target URL http://www.alisoft.com/im/gettip.html, and the provider has redirected this URL to a redirected URL http://www.alisoft.com/portal/getnewtip.html. After the user sends a URL request using the client 501, the HTTP server 510 receives and processes the URL request through the HTTP server end 512. For example, the HTTP server end 512 may submit the user URL request to the target URL and receive a response. The HTTP server end 512 forwards the received response to the redirection analysis module 514 which then determines whether a redirection is required. If the redirection is not required, the redirection analysis module 514 returns the requested target URL content 504 to the HTTP server end 512 which in turn sends the URL content 504 to the client 501. It is appreciated that the server end 512 may have retained target URL content 504 and only sent an HTTP header to the redirection analysis module 514 to analysis. In this case, the redirection analysis module 514 instructs the server end 512 to send the target URL content 504 to the client 501 upon determining that no redirection is required.

If a redirection is required, the redirection analysis module 514 submits a request to the redirected URL http://www.alisoft.com/portla/getnewtip.html to obtain the redirected URL content 505. The redirection analysis module 514 may do this either directly or instruct another functional module such as the server end 512 of the server 510 to do the same. For example, if the redirection analysis module 514 determines that a command word of an HTTP header in the response is a redirecting command "301", "302", "303", or "307", and a Location header and a URL are included in the response, the redirection analysis module 514 determines that redirection is required and thus submits a request to the URL designated by the Location. In the present example, the URL included in the Location header is the redirected URL. Upon receiving the requested URL content (redirected URL content 505), the redirection analysis module 514 returns the content to the HTTP server end 512. The HTTP server end 512 then sends the redirected URL content 505 to the client 501. This completes the HTTP request service requested by the user.

Figure 6:
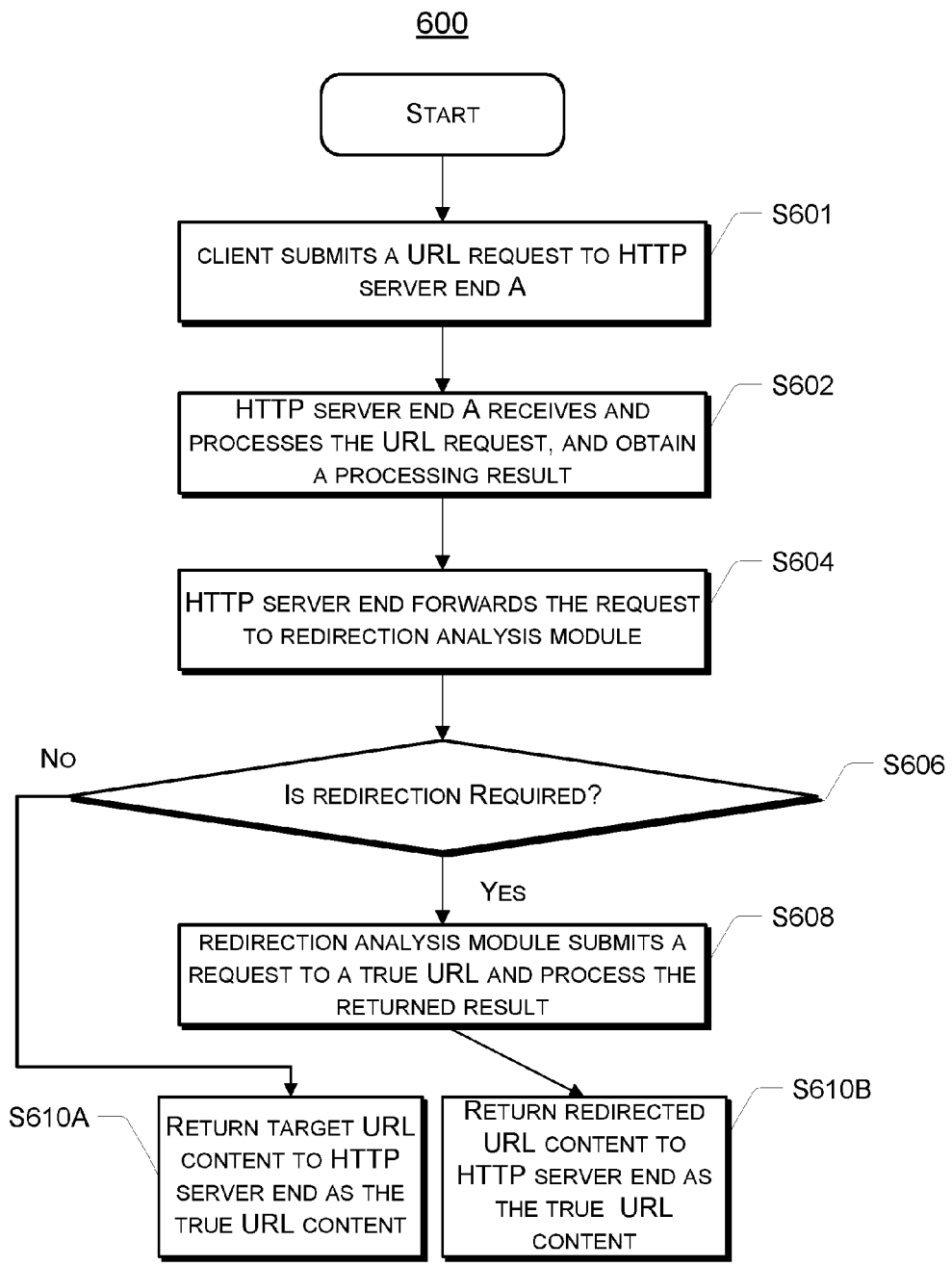
FIG. 6 shows a flow chart illustrating the exemplary process of sending a URL request from a client to an HTTP server in FIG. 5.

FIG. 6 shows a flow chart illustrating the exemplary process 600 of sending a URL request from a client to an HTTP server in FIG. 5. FIG. 6 illustrates an interactive process among the client 501, the HTTP server end 512, and the redirection analysis module 514. The process 600 is described as follows.

Block S601: The client 501 sends a request for an original target URL to the HTTP server end 512.

Block S602: The HTTP server end 512 receives and processes the URL request, and obtains a response to the URL request. For example, the server end 512 may submit a request to the target URL and receive a command in the returned HTTP header.

Block 604: The HTTP server end 512 forwards the URL request from the client and the response to the redirection analysis module 514. The forwarded information may depend on whether the content provider has set to redirect the target URL. If there is no redirection, the server end 512 may simply forward the original URL request. If there is redirecting, the server end 512 may forward the HTTP header information returned from the target URL. In one embodiment, the server end 512 may forward the response only (which in one embodiment is the result of submitting the original target URL request to the target URL) to the redirection analysis module 514.

Block S606: The redirection analysis module 514 determines whether a redirection is required for the URL based on the URL request and the response forwarded by server end 512. If the redirection is required, the process continues to Block S608. If the redirection is not required, the process proceeds to Block S610A. For example, the redirection analysis module 514 analyzes an HTTP header of the processing result. If a command word returned in the HTTP header is a redirecting command "3xx", and a Location header and a redirected URL are included, the redirection analysis module 514 determines that redirection is required. It is appreciated that instead of receiving the response containing the HTTP header forwarded by the server end 512, the redirection analysis module 514 may also request and receive such information directly from the target URL.

Block S608: Upon determining that the redirection is required, the redirection analysis module 514 sends a request to the redirected URL, and processes a returned result.

Block S610B: In case where redirection is required, the redirection analysis module 514 returns the redirected URL content 505 to the HTTP server end 512 as the true URL content.

Block S610A: Upon determining that the redirection is not required, the redirection analysis module 514 returns the original target URL content 504 to the HTTP server end 512 as the true URL content. Alternatively, the server end 512 may have otherwise received the original target URL content 504 (e.g., directly from the target URL). In this case, the redirection analysis module 514 may instruct the server end 512 to send the original target URL content 504 contained therein to the client 501 as the true URL content. The redirection analysis module 514 may also do nothing and let the server end 512 send the target URL content 504 to the client 501 as the true URL content on its own initiative.

Block S610: The HTTP server end 512 returns the true URL content to the client 501. As described above, the true URL content may either be the target URL content 504 or the redirected URL content 505, depending on whether redirection is required.

It is noted that in the above embodiment, the HTTP server end 512 forwards the URL request and the response to the redirection analysis module 514 for analysis and determination. Specifically, the HTTP server end 512 processes the URL request, and forwards the returned result of the URL request to the redirection analysis module 514. Here, the returned result of the URL request may refer to target URL content 504 corresponding to the original URL request of the user and/or an HTTP header containing redirection information, depending whether the provider is required redirecting of the target URL. For example, if the original URL request of the user in this example is http:www.alisoft.com/im/gettip.html, the returned result obtained after the HTTP server end 512 has processed the URL request may be either the original target URL request http:www.alisoft.com/im/gettip.html or the redirected URL request 302 http://www.alisoft.com/portal/getnewtip.html. In other words, the HTTP server end 512 forwards certain relevant information to the redirection analysis module 514 regardless of whether the original URL request of the user requires to be redirected. Under circumstances where a redirection is required, the forwarded information is a returned redirected URL request. Under circumstances where a redirection is not required, the forwarded information is the original URL request.

As illustrated from the above procedures, in order to serve users who submit a request for a target URL, the HTTP server 510 has included therein a redirection analysis module 514 designed for in-server URL redirection. The redirection is therefore performed by the server 510 internally and no longer relies on the URL redirecting capability of the client 501. Moreover, what the client 501 obtains is a true URL content of the original URL request regardless of whether a redirection is required.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   receiving a URL request at a server implemented by one or more computing devices from a client, the URL request requesting a target URL content accessible by the server;
   generating within the server a response to the URL request;
   obtaining a true URL content by the server according to the response, wherein the true URL content includes the target URL content when the response includes no redirection information, and the true URL content includes a redirected URL content associated with a redirected URL when the response includes redirection information indicating the redirected URL; and
   sending the true URL content to the client.

2. The method as recited in claim 1, wherein generating within the server a response to the URL request includes:
   submitting the URL request to the target URL; and
   receiving the response from the target URL.

3. The method as recited in claim 1, wherein obtaining a true URL content by the server according to the response includes:
   determining by the server the redirected URL indicated by the response;
   submitting by the server a redirected URL request to the redirected URL; and
   receiving the redirected URL content from the redirected URL.

4. The method as recited in claim 1, further comprising determining whether a redirection is to be performed.

5. The method as recited in claim 4, wherein obtaining the true URL content by the server according to the response in response to determining that the redirection is to be performed includes:
   submitting a request to the redirected URL; and
   receiving the redirected URL content of the redirected URL.

6. The method as recited in claim 1, further comprising identifying the redirected URL associated with a 3xx redirection command in a HTTP header of the response.

7. The method as recited in claim 1, wherein obtaining the true URL content by the server according to the response includes:
   sending a request to the redirected URL; and
   receiving the redirected URL content.

8. The method as recited in claim 1, wherein the target URL and the redirected URL are hosted by different servers.

9. One or more memories storing executable instructions that, when executed by a server implemented by one or more computing devices, cause the server to perform acts comprising:
   receiving a URL request by the server from a client, the URL request requesting a target URL content accessible by the server;
   generating within the server a response to the URL request, the response containing redirection information indicating a redirected URL,
   obtaining a true URL content by the server according to the response, wherein the true URL content includes the target URL content when the response includes no redirection information, and the true URL content includes a redirected URL content associated with a redirected URL when the response includes redirection information indicating the redirected URL; and
   sending the redirected URL content to the client.

10. The one or more memories as recited in claim 9, wherein generating within the server a response to the URL request includes:
    submitting the URL request to the target URL; and
    receiving the response from the target URL.

11. The one or more memories as recited in claim 9, wherein obtaining the redirected URL content by the server includes:
    submitting by the server a redirected URL request to the redirected URL; and
    receiving the redirected URL content from the redirected URL.

12. The one or more memories as recited in claim 9, the acts further comprising identifying the redirected URL associated with a 3xx redirection command in a HTTP header of the response.

13. A method comprising:
    receiving a URL request at a server implemented by one or more computing devices from a client, the URL request requesting a target URL content hosted on the server;
    generating within the server a response to the URL request;
    obtaining a true URL content by the server according to the response, wherein the true URL content includes the target URL content when the response includes no redirection information, and the true URL content includes a redirected URL content associated with a redirected URL when the response includes redirection information indicating the redirected URL; and
    sending the true URL content to the client.

14. The method as recited in claim 13, wherein generating within the server a response to the URL request includes:
    submitting the URL request to the target URL; and
    receiving the response from the target URL.

15. The method as recited in claim 13, wherein obtaining a true URL content by the server according to the response includes:
    determining by the server the redirected URL indicated by the response;
    submitting by the server a redirected URL request to the redirected URL; and
    receiving the redirected URL content from the redirected URL.

16. The method as recited in claim 13, further comprising determining whether a redirection is to be performed.

17. The method as recited in claim 16, wherein obtaining the true URL content by the server according to the response in response to determining that the redirection is to be performed includes:

submitting a request to the redirected URL; and
receiving the redirected URL content of the redirected URL.

18. The method as recited in claim 13, further comprising identifying the redirected URL associated with a 3xx redirection command in a HTTP header of the response.

19. The method as recited in claim 13, wherein obtaining the true URL content by the server according to the response includes:
sending a request to the redirected URL; and
receiving the redirected URL content.

20. The method as recited in claim 13, wherein the target URL and the redirected URL are hosted by different servers.

* * * * *